(12) United States Patent
Chang et al.

(10) Patent No.: US 9,323,295 B2
(45) Date of Patent: Apr. 26, 2016

(54) TOUCH PANEL

(71) Applicants: Ting-Yu Chang, Kaohsiung County (TW); Kuo-Chang Su, Tainan (TW)

(72) Inventors: Ting-Yu Chang, Kaohsiung County (TW); Kuo-Chang Su, Tainan (TW)

(73) Assignee: WINTEK CORPORATION, Tiachung (TW)

( * ) Notice: Subject to any disclaimer, the term of this patent is extended or adjusted under 35 U.S.C. 154(b) by 31 days.

(21) Appl. No.: 14/072,811

(22) Filed: Nov. 6, 2013

(65) Prior Publication Data
US 2014/0125883 A1    May 8, 2014

(30) Foreign Application Priority Data

Nov. 7, 2012  (TW) .............................. 101141443 A

(51) Int. Cl.
G06F 3/045 (2006.01)
G06F 1/16 (2006.01)
G06F 3/044 (2006.01)

(52) U.S. Cl.
CPC .............. *G06F 1/1692* (2013.01); *G06F 3/044* (2013.01)

(58) Field of Classification Search
None
See application file for complete search history.

(56) References Cited

U.S. PATENT DOCUMENTS

2010/0163394 A1* 7/2010 Tang et al. .................... 200/600

FOREIGN PATENT DOCUMENTS

TW  M374618  2/2010

* cited by examiner

*Primary Examiner* — Nicholas Lee
(74) *Attorney, Agent, or Firm* — Jianq Chyun IP Office

(57) ABSTRACT

A touch panel, including a substrate, first electrodes, second electrodes, first connecting lines, first pads, second connecting lines, and second pads, is provided. The first electrodes are arranged in an array to define a plurality of columns each parallel to a first direction and a plurality of rows each parallel to a second direction intersecting the first direction. Each of the second electrodes is extended in the first direction. The second electrodes are sequentially arranged in the second direction so that one column of the first electrodes is disposed between two adjacent second electrodes. The first connecting lines connect the first electrodes in the same row into a series connected to one first pad. The second electrodes are connected to the second pads through the second connecting lines. The first electrodes, the second electrodes, the first connecting lines, and the second connecting lines do not intersect one another.

8 Claims, 4 Drawing Sheets

TOUCH PANEL

CROSS-REFERENCE TO RELATED APPLICATION

This application claims the priority benefit of Taiwan application serial no. 101141443, filed on Nov. 7, 2012. The entirety of the above-mentioned patent application is hereby incorporated by reference herein and made a part of this specification.

BACKGROUND OF THE INVENTION

1. Field of the Invention

The invention is related to a touch panel and particularly related to a touch panel with a mutual-capacitive electrode design.

2. Description of Related Art

A projected-capacitive touch panel achieves mutual-capacitive touch sensing through sensing series that extend in different directions. In terms of structure, the sensing series that extend in different directions are disposed to intersect each other. At least two conductive layers are required for fabricating the sensing series extending in different directions, and the sensing series in different directions need to be insulated at the intersections by an insulating material. Thus, the fabrication of the projected-capacitive touch panel requires at least 3-5 material layers, and as a result, the fabrication time cannot be shortened. Especially, when the material layers are formed into the required patterns through photolithography and etching processes, since the number of masks cannot be reduced, the production costs cannot be lowered effectively.

SUMMARY OF THE INVENTION

The invention provides a touch panel, which does not require conductor elements to intersect each other, for reducing fabrication costs and shortening fabrication time.

The invention provides a touch panel, including a substrate, a plurality of first electrodes, a plurality of second electrodes, a plurality of first connecting lines, a plurality of first pads, a plurality of second connecting lines, and a plurality of second pads. The first electrodes are disposed on the substrate. The first electrodes are arranged in an array to define a plurality of columns each parallel to a first direction and a plurality of rows each parallel to a second direction intersecting the first direction. The second electrodes are disposed on the substrate. Each of the second electrodes is extended in the first direction. The second electrodes are sequentially arranged in the second direction so that one column of the first electrodes is disposed between two adjacent second electrodes. The first connecting line is connected with the first electrodes and connects the first electrodes in the same row into a series. The first pads are disposed on the substrate, and the series are connected with the first pads. The second connecting lines are connected with the second electrodes. The second pads are disposed on the substrate and connected with the second connecting lines. The first electrodes, the second electrodes, the first connecting lines, and the second connecting lines do not intersect one another.

Based on the above, a sensing device of the touch panel according to the invention is formed with conductor patterns that do not intersect each other. Therefore, an insulating material is not needed between the conductor elements, and accordingly, the fabrication time and costs of the touch panel are reduced. Moreover, in the touch panel of the embodiments of the invention, the connecting line connects multiple electrodes into a series. Thus, the multiple electrodes are connected to the same pad, which help reduce the number of the pads and the area required for disposing the pads.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
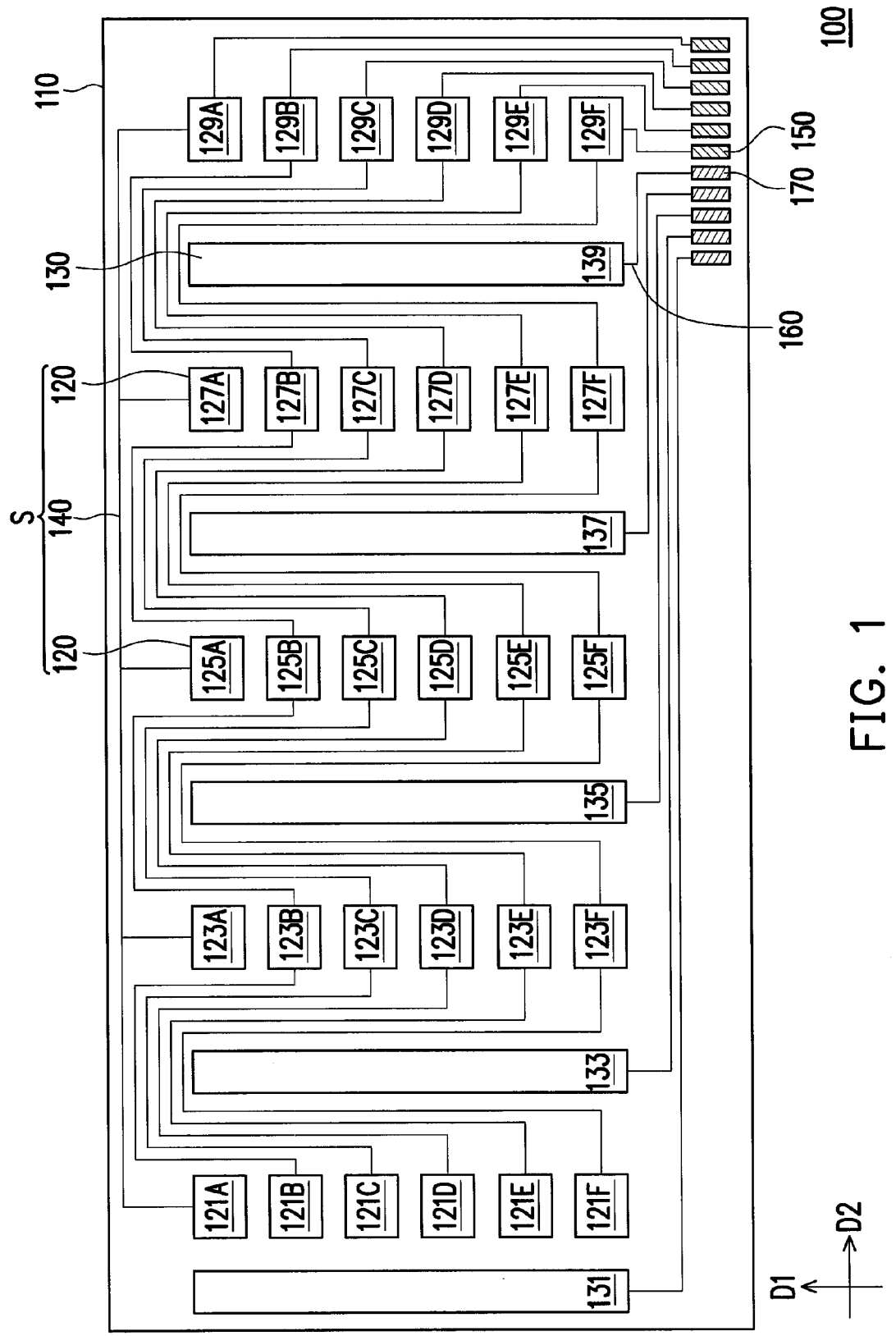
FIG. 1 is a schematic diagram of a touch panel according to the first embodiment of the invention.

Referring to FIG. 1, a touch panel 100 includes a substrate 110, a plurality of first electrodes 120, a plurality of second electrodes 130, a plurality of first connecting lines 140, a plurality of first pads 150, a plurality of second connecting lines 160, and a plurality of second pads 170. The first electrodes 120, the second electrodes 130, the first connecting lines 140, the first pads 150, the second connecting lines 160, and the second pads 170 are disposed on the substrate 110 and are not intersected with each other. Moreover, the substrate 110 may be a substrate constituted by a soft material or a rigid material, such as a glass substrate, a strengthened glass substrate, a plastic substrate, a flexible cover lens, a flexible plastic substrate, for example, a plastic film, a thin glass substrate (as glass film) or a substrate of the display. Herein, the above-mentioned strengthened glass substrate may be a cover lens, and at least one side of the cover lens has a decoration layer (not shown), for example, disposed on a portion of the peripheral area or the entire region of the peripheral area. The above-mentioned substrate of the display may include a color filter substrate of a liquid crystal display or a package substrate of an organic light-emitting display. Further, the above-mentioned substrate of the display can be one of the substrate and the opposite substrate. The first electrodes 120, the second electrodes 130, the first connecting lines 140, and the second connecting lines 160 may be formed of or include an indium tin oxide (ITO), an indium zinc oxide (IZO), a metal mesh material, a nano-scale metal material or a metal material etc.

In FIG. 1, a distance between the first electrodes 120 and the second electrodes 130 is exaggerated to clearly illustrate the connection relationship between these electrodes. Please note that the sizes of the elements described/shown in the following embodiments and figures are for illustration only and are not intended to limit the invention. In fact, a distance between each first electrode 120 and the adjacent second electrode 130 may be less than a width of at least one of the first electrode 120 and the second electrode 130 in a second direction D2. Herein, the first electrodes 120 and the second electrodes 130 have millimeter-level widths in the second direction D2; and the first connecting lines 140 and the second connecting lines 160 have micrometer-level line widths.

In this embodiment, a plurality of the first electrodes 120 may have the same pattern, but the patterns of the first electrodes 120 may be different. The first electrodes 120 are arranged in an array, for example. Herein, the first electrodes that are arranged parallel to a first direction D1 may be deemed as a column, and the first electrodes 120 arranged parallel to the second direction D2 may be deemed as a row, wherein the first direction D1 intersects the second direction D2. Therefore, the first electrodes 120 define a plurality of columns each parallel to the first direction D1 and a plurality of rows each parallel to the second direction D2, for example. According to FIG. 1, the first electrodes 120 of the touch panel 100 define five columns and six rows. However, the aforementioned values are merely examples of the invention and should not be construed as limitations to the scope of the invention. In addition, the first connecting lines 140 are used to connect the first electrodes 120 in the same row into a plurality of series S. The first pads 150 are respectively connected with the series S.

Each of the second electrodes 130 is extended in the first direction D1 and has a strip-shaped pattern. The strip-shaped second electrodes 130 are sequentially arranged in the second direction D2, so that one column of the first electrodes 120 is located between two adjacent second electrodes 130. The second connecting lines 160 respectively connect the second electrodes 130, and the second pads 170 are connected with the second connecting lines 160. That is, the number of the second pads 170 is equal to the number of the second electrodes 130 and the second pads 170 and the second electrodes 130 are one-on-one connected. Accordingly, each of the first electrodes 120 is connected to a control circuit (chip) of the touch panel 100 through the first connecting line 140 and the first pad 150; and each of the second electrodes 130 is connected to the control circuit (chip) through the second connecting line 160 and the second pad 170.

More specifically, in the array of the first electrodes 120, the first electrodes 121A-121F form a first column, the first electrodes 123A-123F form a second column, the first electrodes 125A-125F form a third column, the first electrodes 127A-127F form a fourth column, and the first electrodes 129A-129F form a fifth column, for example. Moreover, the second electrodes 130 for example include the second electrode 131 corresponding to the first electrodes 121A-121F of the first column, the second electrode 133 corresponding to the first electrodes 123A-123F of the second column, the second electrode 135 corresponding to the first electrodes 125A-125F of the third column, the second electrode 137 corresponding to the first electrodes 127A-127F of the fourth column, and the second electrode 139 corresponding to the first electrodes 129A-129F of the fifth column.

When the touch panel 100 performs touch sensing, the second electrode 130 sequentially performs scanning for the corresponding first electrodes 120 to perform sensing of a touch action. Thus, each of the second electrodes 130 may be deemed as a scanning electrode, and the first electrodes 120 located beside the each second electrode 130 may be deemed as sensing electrodes. For example, when the second electrode 131 performs scanning, the first electrodes 121A-121F in the first column perform sensing of the touch action. Because the first electrodes 121A-121F belong to different series S, the first electrodes 121A-121F are not electrically connected with each other and can perform sensing at the same time. In addition, when the second electrode 133 and the second electrodes 135, 137, and 139 respectively perform scanning in the latter timing, the first electrodes 123A-123F in the second column, the first electrodes 125A-125F in the third column, the first electrodes 127A-127F in the fourth column, and the first electrodes 129A-129F in the fifth column respectively perform sensing as well.

Accordingly, the first electrodes 121A, 123A, 125A, 127A, and 129A in the same row perform the sensing respectively corresponding to different scanning timings. Therefore, in this embodiment, the first connecting line 140 connects the first electrodes 121A, 123A, 125A, 127A, and 129A into the series S, and one first pad 150 is used to read or transmit sensing signals of the first electrodes 121A, 123A, 125A, 127A, and 129A, and so on. Consequently, the number of the first pads 150 is significantly reduced.

Hence, in this embodiment, if the number of the columns of the first electrodes 120 is N, the number of the first pads 150 is 1/N of the number of the first electrodes 120. In view of the above, the area required for disposing all the first pads 150 is greatly reduced, which helps to simplify the design of a pad region (a region where the first pads 150 and the second pads 170 are disposed).

Figure 2:
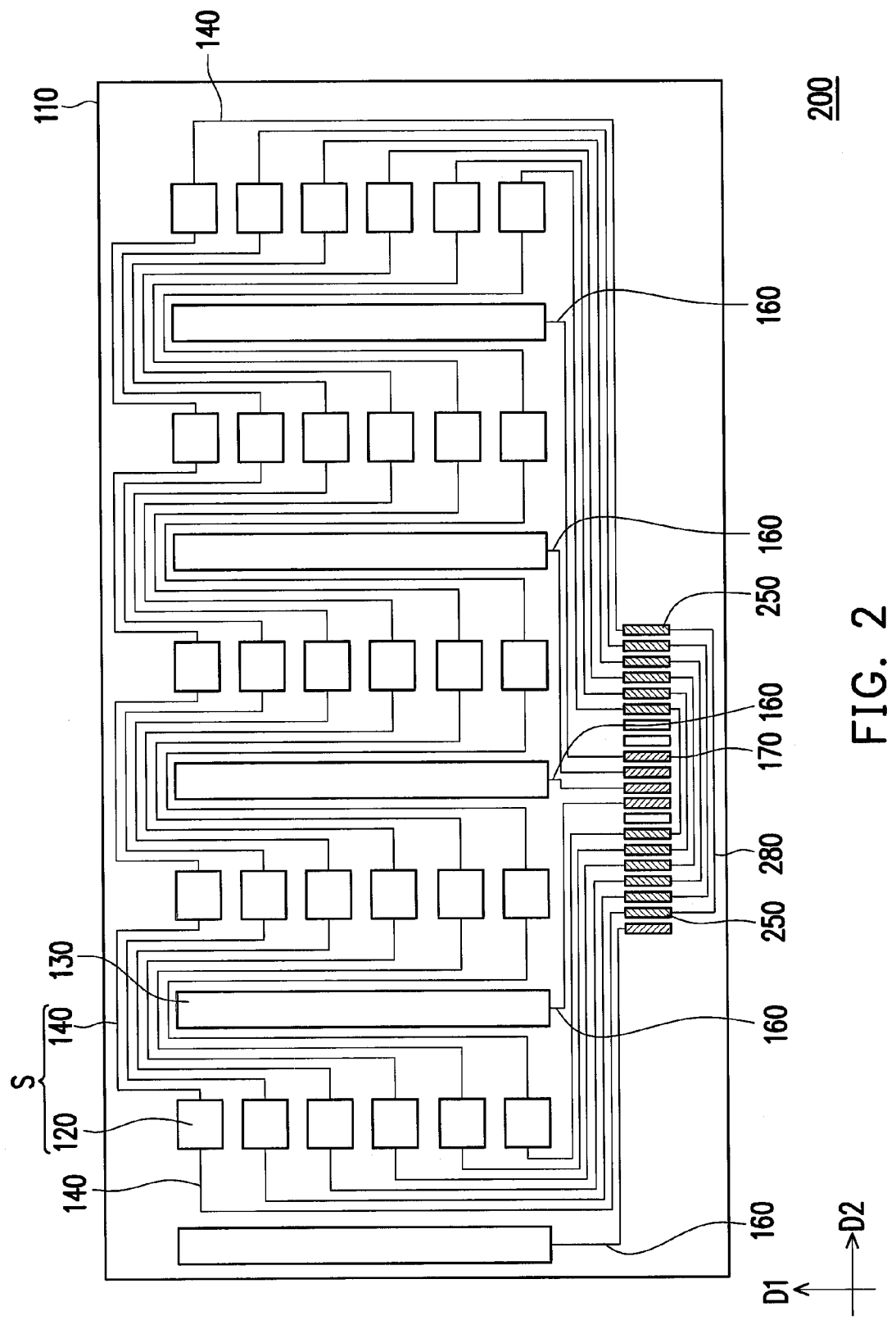
FIG. 2 is a schematic diagram of a touch panel according to the second embodiment of the invention.

Referring to FIG. 2, a touch panel 200 is similar to the touch panel 100 of the first embodiment (as shown in FIG. 1), and a difference lies in that: the touch panel 200 further includes a plurality of third connecting lines 280 and the number of a plurality of first pads 250 is the double of the number of the series S, wherein two ends of the series S are each connected to one first pad 250. In this embodiment, the two first pads 250 that are connected to the same series S are connected by one of the third connecting lines 280.

The first electrodes 120 that form five columns and six rows are connected into six series S, wherein each of the series S is connected to two of the first pads 250. Hence, if the number of the columns of the first electrodes 120 is N, the number of the first pads 250 is substantially 2/N of the number of the first electrodes 120. In addition, each of the series S is connected with one of the third connecting lines 280 in parallel, so as to reduce resistance, which helps to reduce the load of the control circuit (chip) that controls the touch panel 200.

Figure 3:
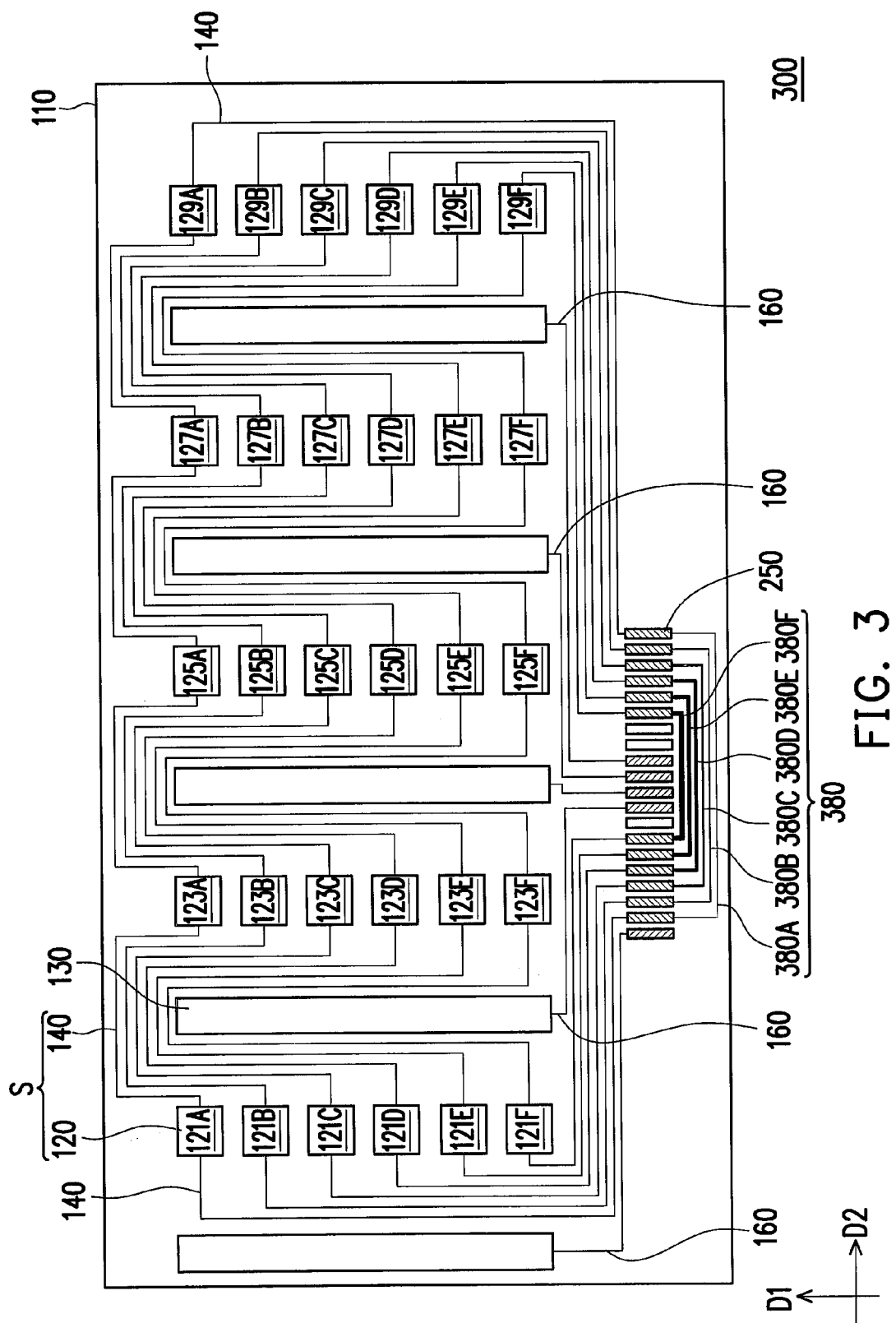
FIG. 3 is a schematic diagram of a touch panel according to the third embodiment of the invention.

Referring to FIG. 3, a touch panel 300 of this embodiment is similar to the touch panel 200 (as shown in FIG. 2). Thus, elements that are the same in the two embodiments are denoted by identical reference numerals.

In this embodiment, the first electrodes 121A, 123A, 125A, 127A, and 129A that belong to the first row are connected into one series S. The first electrodes 121B, 123B, 125B, 127B, and 129B of the second row are connected into one series S. And the rest are connected in the same way.

It can be known from FIG. 3 that the resistances of the six series S vary according to the lengths of wiring routes of the first connecting lines 140. Generally speaking, the resistance of an electronic signal transmission path affects the quality of signal transmission. Due to the different resistances of the six series S, the six series S may have inconsistent signal transmission quality, which impairs the touch accuracy of the touch panel 100. Therefore, in this embodiment, the third connecting lines 380A-380F have different patterns, so as to compensate for the resistance difference between the series S caused by the different lengths of the wiring routes of the first connecting lines 140.

More specifically, according to the layout of FIG. 3, the first connecting line 140 that connects the first electrodes 121F, 123F, 125F, 127F, and 129F of the sixth row into the series S has the longest wiring route. The first connecting line 140 that connects the first electrodes 121A, 123A, 125A, 127A, and 129A of the first row into the series S has the shortest wiring route. Therefore, among the third connecting lines 380A-380F, the third connecting line 380F has the largest line width (relatively least resistance) and the third connecting line 380A has the smallest line width (relatively most resistance). The line widths of the third connecting lines 380B, 380C, and 380D are increased in sequence. Accordingly, through connecting the third connecting lines 380 in parallel, the equivalent resistances of the series S are made more uniform to achieve ideal signal transmission quality, such that the touch panel 300 provides ideal touch accuracy.

FIG. 3 illustrates that the resistances of the third connecting lines 380A-380F are adjusted through design of the line widths; however, the invention is not limited thereto. Generally speaking, the third connecting lines 380A-380F may be designed to have different patterns to have different resistances. Therefore, in other embodiments, the third connecting lines 380A-380F may have different lengths of wiring routes, different film thicknesses, or different stack structures. For example, one or more of the third connecting lines 380 may have a zigzag or meandering pattern, so as to have larger resistance.

Figure 4:
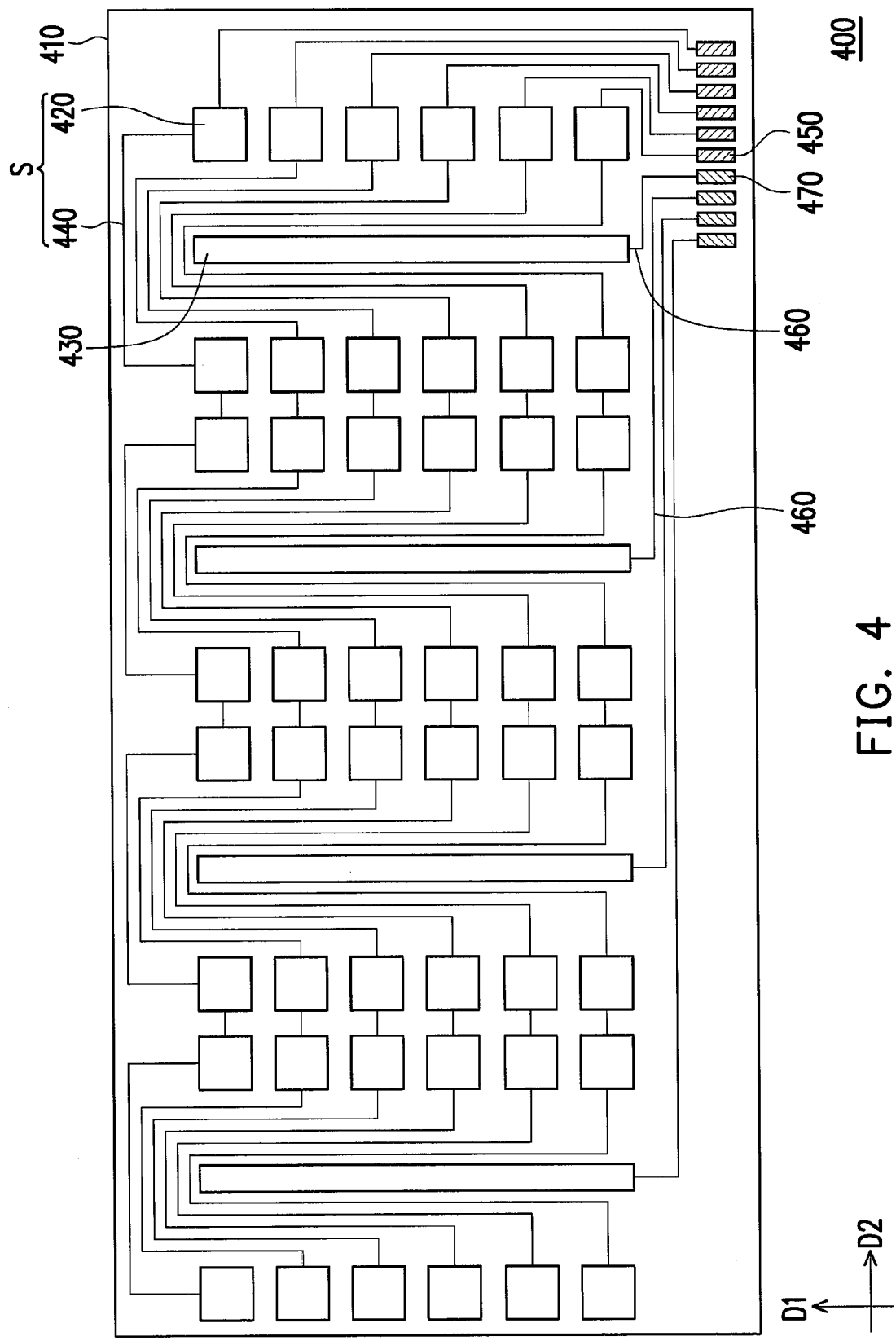
FIG. 4 is a schematic diagram of a touch panel according to the fourth embodiment of the invention.

In the above embodiments, one column of the first electrodes 120 is located between two adjacent second electrodes 130, but the invention is not limited thereto. For example, referring to FIG. 4, a touch panel 400 includes a substrate 410, a plurality of first electrodes 420, a plurality of second electrodes 430, a plurality of first connecting lines 440, a plurality of first pads 450, a plurality of second connecting lines 460, and a plurality of second pads 470. The first electrodes 420, the second electrodes 430, the first connecting lines 440, the first pads 450, the second connecting lines 460, and the second pads 470 are disposed on the substrate 410. In addition, the first electrodes 420, the second electrodes 430, the first connecting lines 440, and the second connecting lines 460 are disposed on the same plane and are not intersected with each other.

A difference between this embodiment and the above embodiments lies in that: in this embodiment, two columns of the first electrodes 420 are disposed between two adjacent second electrodes 430. Each of the second electrodes 430 is extended in the first direction D1 and has a strip-shaped pattern. Each of the second electrodes 430 and the two columns of the first electrodes 420 respectively located on two sides of the second electrode 430 form a sensing electrode group. When each of the second electrodes 430 performs scanning, the two columns of the first electrodes 420 respectively located on two sides of the second electrode 430 perform sensing.

In the touch panel 400 of this embodiment, the number of the first pads 450 is equal to the number of the series S. Nevertheless, in other embodiments, the number of the first pads 450 may be the double of the number of the series S, such that the two ends of the series S are each connected to one first pad 450. Moreover, such a touch panel may further include the third connecting lines 280 or 380 shown in FIG. 2 or 3, so as to make the equivalent resistances of the series S uniform to improve the sensing quality.

To conclude the above, in the touch panel of the embodiments of the invention, multiple sensing electrodes are connected into series, such that the pads connected to the series are capable of transmitting signals of the multiple sensing electrodes. Consequently, the number of the pads is less than the number of the electrodes, which reduces the area required for disposing the pads.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A touch panel, comprising:
a substrate;
a plurality of first electrodes disposed on the substrate and arranged in an array to define a plurality of columns parallel to a first direction and a plurality of rows parallel to a second direction intersecting the first direction;
a plurality of second electrodes disposed on the substrate and each extended in the first direction, and the second electrodes being sequentially arranged in the second direction so that one of the columns of the first electrodes is disposed between two adjacent second electrodes;
a plurality of first connecting lines connected with the first electrodes and connecting the first electrodes in the same row into a series;
a plurality of first pads disposed on the substrate, and at least one end of the series being respectively connected with the first pads;
a plurality of second connecting lines connected with the second electrodes; and
a plurality of second pads disposed on the substrate and connected with the second connecting lines, wherein the first electrodes, the second electrodes, the first connecting lines, and the second connecting lines do not intersect each other.

2. The touch panel according to claim 1, wherein two columns of the first electrodes are disposed between two adjacent second electrodes, and two first electrodes paralleled in the second direction are connected with each other by the first connecting lines.

3. The touch panel according to claim 1, wherein the number of the first pads is equal to the double of the number of the series, and two ends of the series is each connected with one of the first pads.

4. The touch panel according to claim 3, further comprising a plurality of third connecting lines each connecting two of the first pads, and the two first pads are connected with the same series.

5. The touch panel according to claim 4, wherein the third connecting lines have different patterns.

6. The touch panel according to claim 4, wherein the third connecting lines have different line widths.

7. The touch panel according to claim 1, wherein a distance between each of the second electrodes and the adjacent first electrodes is less than a width of each of the second electrodes in the second direction and less than a width of each of the first electrodes in the second direction.

8. The touch panel according to claim 1, wherein each of the first connecting lines has a micrometer-level line width, and each of the first electrodes and the second electrodes has a millimeter-level width.

* * * * *